(12) United States Patent
Umeda et al.

(10) Patent No.: US 7,149,364 B2
(45) Date of Patent: Dec. 12, 2006

(54) MEAN FILTER DEVICE AND FILTERING METHOD

(75) Inventors: Kohei Umeda, Kawasaki (JP); Atsushi Yamaji, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 152 days.

(21) Appl. No.: 11/074,992

(22) Filed: Mar. 7, 2005

(65) Prior Publication Data

US 2005/0147315 A1 Jul. 7, 2005

Related U.S. Application Data

(63) Continuation of application No. PCT/JP03/01009, filed on Jan. 31, 2003.

(51) Int. Cl.
*G06K 9/40* (2006.01)

(52) U.S. Cl. .................................................. 382/260

(58) Field of Classification Search ........ 382/260–262, 382/275, 305; 345/673
See application file for complete search history.

(56) References Cited

U.S. PATENT DOCUMENTS 4,682,301 A 7/1987 Horiba et al.

5,428,397 A * 6/1995 Lee et al. ................... 348/448
6,078,686 A * 6/2000 Kim ........................... 382/167

FOREIGN PATENT DOCUMENTS

| JP | 59-51686 | 3/1984 |
|---|---|---|
| JP | 3-245278 | 10/1991 |
| JP | 8-181917 | 7/1996 |
| JP | 2000-022958 | 1/2000 |

\* cited by examiner

*Primary Examiner*—Kanjibhai Patel
(74) *Attorney, Agent, or Firm*—Katten Muchin Rosenman LLP

(57) ABSTRACT

An mean (average value) filter apparatus includes first accumulation means (1) for accumulating a predetermined number of pixels located in the vicinity of each pixel in a first dimensional direction for the pixel data arrangement constituting a second dimensional image, thereby generating first accumulation pixel data of each of the pixels, second accumulation means (2) for accumulating the aforementioned first accumulation pixel data for a predetermined number of pixels located in the vicinity of each pixel in the second dimensional direction, thereby generating second accumulation pixel data of each of the pixels, and division means (45) for dividing the second accumulation pixel data by the number of pixels accumulated in the first dimensional direction and the second dimensional direction.

17 Claims, 13 Drawing Sheets

FIG. 10

MEAN FILTER DEVICE AND FILTERING METHOD

CROSS-REFERENCE TO RELATED APPLICATION

This application is a continuation of International Application PCT/JP2003/001009 filed on Jan. 31, 2003, the contents of which are herein wholly incorporated by reference.

BACKGROUND OF THE INVENTION

1. Technical Field

The present invention relates to a data filtering technology.

2. Background Arts

In image processing, etc., there is a case of separating spatial frequencies on a whole image plane into low frequency components and high frequency component in order to remarkably improve visual recognizability of a displayed image. Then, a known technology is, for example, such that the low frequency components are restrained and thus synthesized with the high frequency components, and a dynamic range, with contrasts in minutes portions kept, is compressed, and so forth.

The separation into the low frequency components in such a case involves using, generally, a moving average. The moving average is a process of obtaining an average of, e.g., $(2n+1) \times (2n+1)$ matrix with respect to all pixels given by $Np \times Np$. Herein, $2n+1$ is an odd number equal to or smaller than $Np$.

FIG. 1 shows a processing example of a mean filter. As shown in FIG. 1, in the mean filter, a mean value of a pixel density value of a target pixel M and pixel density values of pixels peripheral to the target pixel M, is set as a new density value of the target pixel M. When selecting, e.g., n=2, 25 pieces of pixel data (A, B, . . . , Y) disposed in bilateral and vertical directions of the pixel M are added, and an added value is divided by 25, thereby acquiring the pixel M subjected to the filtering process.

FIGS. 2 through 5 show a method of configuring a conventional mean filter. This type of mean filter is configured softwarewise or hardwarewise.

(1) Softwarewise Configuration

FIG. 2 shows an example of configuring the mean filter softwarewise. This mean filter includes a frame memory 302 for retaining input image data, a DSP (Digital Signal processor) 301 for processing the input image data by executing the software, and a calculation memory 303 for calculation of the DSP.

In the case of configuring the mean filter by the software on the DSP 301, the (5×5) pixels such as A, B, . . . , Y shown in FIG. 1 are read from the input image data stored on the frame memory sequentially on a pixel-by-pixel basis into the DSP 301. Then, a mean value of the matrix is calculated by a processing flow as in FIG. 3 by use of the calculation memory 303.

In FIG. 3, the pixel data are read pixel by pixel and sequentially added to a total sum (S). This process is repeated for the pixels A through Y, and the value is divided by 25. In this process, the processing of the (5×5) matrix requires totally 28 steps such as initialization (1 step) of the total sum (S), additions (25 steps) of the pixels A through Y, division (1 step) of the total sum (S) by 25 and the output (1 step) from the calculation memory.

Now, supposing that a clock per pixel on an unillustrated display device is set to 25 MHz, realtime processing of each pixel is required to be done at 700 MHz given by 25 MHz×28=700 MHz, or higher even when each step is processed at 1 clock.

(2) Hardwarewise Configuration (2-1) Case of Fixed Filter Size

In the case of configuring the mean filter hardwarewise, it is required that the (5×5) matrix peripheral to each pixel be formed with respect to each of the pixels (e.g., 640×480 pixels) of the input image data. For calculating a total value of this (5×5) matrix for every pixel needs to adjust timing (a phase) for addition.

For example, as shown in FIG. 1, when adding the (5×5) matrix peripheral to the pixel M, the phases (the addition timing) of pieces of pixel data A, B, . . . , X are required to be adjusted to a position of the pixel data Y.

Now, as shown in FIG. 1, the lateral direction on the image plane on the image data is called a pixel direction, and the vertical direction is called a line direction. The pixel direction is a direction of moving with the clock on the pixel-by-pixel basis. Further, the line direction is a direction of moving along the line (one row consisting of, e.g., 640 pieces of pixels) perpendicular to the pixel direction. Note that the line is also referred to as the row.

To start with, a discussion on the fifth line (pieces of pixel data U through Y) is made. Respective pieces of pixel data on the fifth line are in the same line as the pixel data Y exists. Hence, there is no necessity of line-delaying respective pieces of pixel data in the fifth line with respect to the pixel data Y. Therefore, the pixel data U is delayed by 4 clocks, the pixel data V is delayed by 3 clocks, the pixel data W is delayed by 2 clocks, and the pixel data X is delayed by 1 clock. The delay of the pixel data may involve using, e.g., a FF (flip-flop). The phases of pieces of pixel data are thereby adjusted to the position of the pixel data Y. A total value of the fifth line is obtained by adding the thus-phase-adjusted pixel data.

Next, the input image data is delayed by 1 line (e.g., 640 pixels) by use of the line memory, and the line of the pixel data P through T is adjusted to the position of the fifth line. Then, the phases of the pixel data P through T are adjusted to the position of the data Y, thereby calculating a total value of the pixel data P through T. Thus, the input image data are sequentially delayed line by line, thus delaying the respective lines up to the fifth line. Then, the pixel data are added in adjustment with the position of the pixel Y by use of the FF. Through this processing, the total value of each line is obtained. Then, the total values of the respective lines are sequentially added, thereby acquiring a total value of the 25 pixels. Moreover, this total value is divided by 25, thereby configuring the mean filter.

FIG. 4 shows a configuration of the mean filter having a (5×5) filter size based on such a circuit. This mean filter circuit includes line memories 311 through 314 for causing delays in the line direction, pixel-directional calculation units 320 through 324 for executing the 5-pixel additions on a line-by-line basis, adders 361 through 365 for sequentially adding the added data of the respective lines, and a multiplier 365 for executing the division by 25 (multiplication by 1/25).

An interior of the pixel-directional calculation unit 320 is constructed of FFs 331 through 334 and adders 341 through 344. The FFs 331 through 334 cause 1-clock delays of the pixel data such as U, V, W, X to be inputted in sequence. Thus, for example, phases of five pieces of pixel data U, V, W, X, Y in the fifth line (containing U, V, W, X, Y) shown in FIG. 1 can be adjusted, and an addable state occurs. In the configuration in FIG. 4, these pieces of pixel data are added by the adders 341 through 344.

The line memories 311 through 314 receive a sequential input of 1-pixel data at 1 clock and are thus stored with 1-line data. Herein, an assumption for facilitating comprehension is that one line consists of, e.g., 640 pixels. Then, the line memory 311 is stored with the data for 1 line (which is called a line L1) at the first 640 clocks. At this time, each piece of the pixel data of the line L1 has a 5-pixel addition by the pixel-directional calculation unit 320, however, this addition is out of phase and is therefore discarded.

Further, at the next 640 clocks, the pixel data of a next line (which is called a line L2) are stored on the line memory 311. At this time, each piece of data of the line L2 has a 5-pixel addition by the pixel-directional calculation unit 320, however, this addition is out of phase and is therefore discarded. Moreover, the data of the line L1 are stored on the line memory 312. At this time, each piece of data of the line L1 has a 5-pixel addition by the pixel-directional calculation unit 321, however, this addition is likewise out of phase and is therefore discarded.

With repetitions of such processing, there occurs a state wherein the pixel data of the first line L1 are stored on the line memory 314, the pixel data of the next line L2 are stored on the line memory 313, the pixel data of the further next line L3 are stored on the line memory 312, and the pixel data of the yet further next line L4 are stored on the line memory 311.

In this state, from the next clocks, the pixel data of the next line L5 are inputted as an input image to the pixel-directional calculation unit 320. Moreover, the pixel data of the lines L4 through L1 are inputted to the pixel-directional calculation units 321 through 324, respectively.

With this processing, it follows that each piece of pixel data of the 5 lines has the 5-pixel addition in the pixel direction in the same phase by the pixel-directional calculation units 320 through 324. Furthermore, the output (the pixel data of each pixel that is replaced with the data integrated by every 5 pixels in the pixel direction) of each of the pixel-directional calculation units 320 through 324 has 5-line integration in the line direction by the adders 361 through 364. The (5×5) pixel data are thereby integrated in the pixel direction and in the line direction, and the integrated result is inputted to the multiplier 365. The multiplier 365 divides this integrated result by 25, thereby outputting a mean value of the 25 pixels.

As in FIG. 4, the (5×5) mean filter needs 20 pieces of FFs, 24 pieces of adders and one piece of multiplier.

FIG. 5 shows a configuration generalized into an (N×N) mean filter. As illustrated in FIG. 5, pieces of hardware for actualizing the (N×N) mean filter are [N−1] systems of line memories for delaying the image data line by line, [(N−1)× N] pieces of FFs, [(N×N)−1] pieces of adders, and one piece of multiplier.

(2-2) Case of Variable Filter Size

FIG. 6 shows a mean filter circuit having a variable filter size (3×3 through N×N). As in FIG. 6, when the filter size is variable from 3×3 to N×N, a configuration having the maximum filter size "N×N" is always prepared as a circuit configuration (the FFs, the line memories and the adders).

Then, the FF outputs of the configuration corresponding to the designated filter size are selected from the total values of the respective lines, and the added values are obtained, thereby enabling the mean filter having the arbitrary filter size to be configured.

For this selection of the FF outputs, the filter circuit in FIG. 6 includes selectors 370, 371, etc. For instance, the selector 371 is a circuit for selecting an arbitrary number (3 through N) of added values in the pixel-directional calculation unit 320. A switching signal 381 designates how many added values are selected. Other pixel-directional calculation units 321, 322, . . . have the same construction.

Moreover, the selector 370 is a circuit for selecting the added result of an arbitrary number of lines among within the line-directional adders, 361, . . . , to which the output of the pixel-direction calculation unit 320, etc. is further added. A switching signal 380 designates the selection of the number of additions in the line direction.

SUMMARY OF THE INVENTION

The following problems arise in the prior arts.

(1) In the case of an image processing device in which the calculation delay is allowed only on the line-by-line basis, the softwarewise configuration of the prior art as shown in FIG. 2 employs the frame memories and the calculation memories by which the pixel data are read pixel by pixel into the DSP, and the calculation is performed. Hence, a tremendous number of processing steps are conducted, resulting in occurrence of a frame delay. This frame delay is on the order of, e.g., 1/30sec or longer (display time for one frame), wherein the realtime processing is extremely difficult. The realtime processing herein connotes image processing with a line delay (equivalent to a delay of a few or several lines).

(2) The hardwarewise configuration shown in FIG. 5 can not be applied to an image processing device that needs to actualize a low cost and downsizing of the device. Namely, the prior art has, as shown in FIG. 5, a large hardware scale when configuring the mean filter. [(N−1)×N] pieces of FFs and [(N×N)−1] pieces of adders are needed for configuring the (N×N) mean filter.

(3) In the case of configuring a variable mean filter, among the mean filters having a variable filter size of 3×3 through N×N, the hardware scale invariably requires preparing the mean filter having the (N×N) filter size. Then, the added values based on the filter size, which are suited to the designated arbitrary filter size, are to be obtained, and hence there occurs more of numerous redundant circuits such as unnecessary FFs, line memories, adders, etc. as the filter size of the mean filter selected becomes smaller. For example, when calculated by use of the mean filter in FIG. 5, the (3×3) mean filter requires 6 pieces of FFs and 8 pieces of adders, while a (21×21) mean filter needs 420 pieces of FFs and 440 pieces of adders. Accordingly, in the case of the selecting the (3×3) mean filter, it follows that 414 pieces of FFs and 432 pieces of adders become unnecessary.

The present invention was devised in view of such problems inherent in the prior arts. Namely, it is an object of the present invention to provide a mean filter capable of processing the image data in realtime without increasing the hardware scale. The realtime herein implies that the processing is completed within a period of time during which no frame delay occurs at the maximum.

The present invention adopts the following means in order to solve the above problems. Namely, the present invention is a mean filter device comprising first integrating means integrating a predetermined number of pieces of pixel data disposed in periphery of each pixel in a first linear direction in a pixel data matrix forming a two-dimensional image, and thus generating first integrated pixel data of each of the pixels, second integrating means integrating the first integrated pixel data corresponding to a predetermined number of pixels disposed in the periphery of each of the pixels in a second linear direction, and thus generating second integrated pixel data of each of the pixels, and means dividing the second integrated pixel data by the number of pixels integrated in the first linear direction and in the second linear direction.

This mean filter device generates the first integrated pixel data of the respective pixels by integrating the predetermined number of pieces of pixel data disposed in the periphery of each of the pixels in the first linear direction in the pixel data matrix forming the two-dimensional image. Further, the mean filter device generates the second integrated pixel data of each of the pixels by integrating the first integrated pixel data corresponding to the predetermined number of pixels disposed in the periphery of each of the pixels in the second linear direction. Thus, this mean filter device integrates the predetermined number of pieces of pixel data in the periphery of each of the pixels of the two-dimensional image, whereby the mean filter can be actualized.

Preferably, the first integrating means may include first sequential integrating means integrating the pixel data sequentially in the first linear direction, and first subtracting means subtracting, from the sequentially integrated results, the pixel data of the pixel disposed apart by a predetermined number of pixels in the first linear direction from the integration target pixels to be integrated sequentially.

Namely, in this mean filter device, the pixel data are integrated sequentially in the first linear direction, and the pixel data of the pixel disposed apart by the predetermined or larger number of pixels is subtracted from the integrated results, thereby actualizing the integration of the pixel data of the predetermined number of pixels disposed in the periphery of each of the pixels in the first linear direction.

Preferably, the first sequential integrating means may include first adding means adding the input pixel data inputted and the pixel data already integrated before inputting the input pixel data, and addition retaining means retaining the already-integrated pixel data, the first subtracting means may include input retaining means retaining the predetermined number of pieces of input pixel data in sequence, and a first subtracter subtracting, from an output of the first adding means, the input pixel data disposed apart by the predetermined number of pieces of pixel data from the now-inputted pixel data and outputting the subtracted result as a predetermined pixel integrated value to the addition retaining means, and the addition retaining means may feedback-output the predetermined pixel integrated value to the first adding means for a next addition.

That is, in this mean filter device, the added results retained on the addition retaining means are feedback-outputted to the first adding means, thereby actualizing the sequential additions in the first linear direction. Further, in this mean filter device, the predetermined number of pieces of input pixel data are sequentially retained, and the input pixel data of the pixel disposed apart by the predetermined number of pixels is subtracted from the results of the sequential additions.

Preferably, the input retaining means may include a shift register storing the data corresponding each pixel by shifting, and a selector selectively outputting any one piece of pixel data among the pieces of pixel data stored in the respective shift positions on the shift register.

Thus, any one piece of pixel data among the pixel data stored in the respective shift positions on the shift register is selectively outputted, whereby a range of the pixels to be added can be changed by changing the position of the data that should be subtracted.

Preferably, the second integrating means may include second sequential integrating means integrating the pixel data sequentially in the second linear direction, and second subtracting means subtracting, from a result of the sequential integration, the pixel data of the pixel disposed apart by the predetermined number of pieces of pixels in the second linear direction from the integration target pixels to be integrated in sequence.

Namely, in this mean filter device, the pixel data are sequentially integrated in the second linear direction, and the pixel data of the pixel disposed apart by the predetermined number of pixels is subtracted from the integrated results, thereby actualizing the integration of the predetermined number of pieces of pixel data of the pixels disposed in the periphery of each of the pixels in the second linear direction.

Preferably, the second sequential integrating means may include second adding means adding the first integrated pixel data inputted from the first integrating means to the pixel data already integrated in the second linear direction before inputting the first integrated pixel data, and line addition retaining means retaining the second-linear-directionally integrated pixel data for one line in the first linear direction, the second subtracting means may include first linear integrated data retaining means sequentially retaining the first integrated pixel data for a predetermined number of lines that are inputted from the first integrating means, and a second subtracter subtracting, from an output of the second adding means, the first integrated pixel data of the line disposed apart by a predetermined number of lines from the now-inputted first integrated pixel data, and outputting the subtracted result as a predetermined line integrated value to the line addition retaining means, and the line addition retaining means may feedback-output the predetermined line integrated value to the second adding means for a next addition.

Namely, in this mean filter device, the added results retained on the line addition retaining means are feedback-outputted to the second adding means, thereby actualizing the sequential additions in the second linear direction. Further, in this mean filter device, the first integrated pixel data for the predetermined number of lines are sequentially retained, and the first integrated pixel data of the line disposed apart by the predetermined number of lines is subtracted from the sequentially added results.

Preferably, the first linear integrated data retaining means may include a line memory retaining line data corresponding the pixels, arranged in the first linear direction, of the two-dimensional image in a way that shifts the line data over a plurality of lines, and a line selection unit selectively outputting any one of the plural lines.

Thus, the line is selectively outputted from the line memories for the plurality of lines, whereby the range of the pixels to be added in the line direction can be changed by changing the position of the data that should be subtracted.

Further, the present invention may also be an imaging device including the mean filter device described above. Still further, the present invention may also be a filtering method for executing the mean filter processing described above.

BRIEF DESCRIPTION OF THE DRAWINGS

FIG. 10 is an explanatory diagram of input image data in the embodiment of the present invention;

DETAILED DESCRIPTION OF THE INVENTION

Preferred embodiments of the present invention will hereinafter be described with reference to the drawings.

<<First Embodiment>>

A mean filter according to a first embodiment of the present invention will hereinafter be described with reference to the drawings in FIGS. 7 through 12.

Realtime high speed dynamic image processing has a problem in its processing time and such a problem that a circuit scale is not realistic, however, hardware is more advantageous in terms of the high speed processing than software.

The first embodiment will give, based on these features, a discussion on a mean filter arithmetic circuit capable of actualizing downsizing of the hardware and the realtime arithmetic operation for the realtime high-speed dynamic image processing.

<Configuration>

Figure 7:
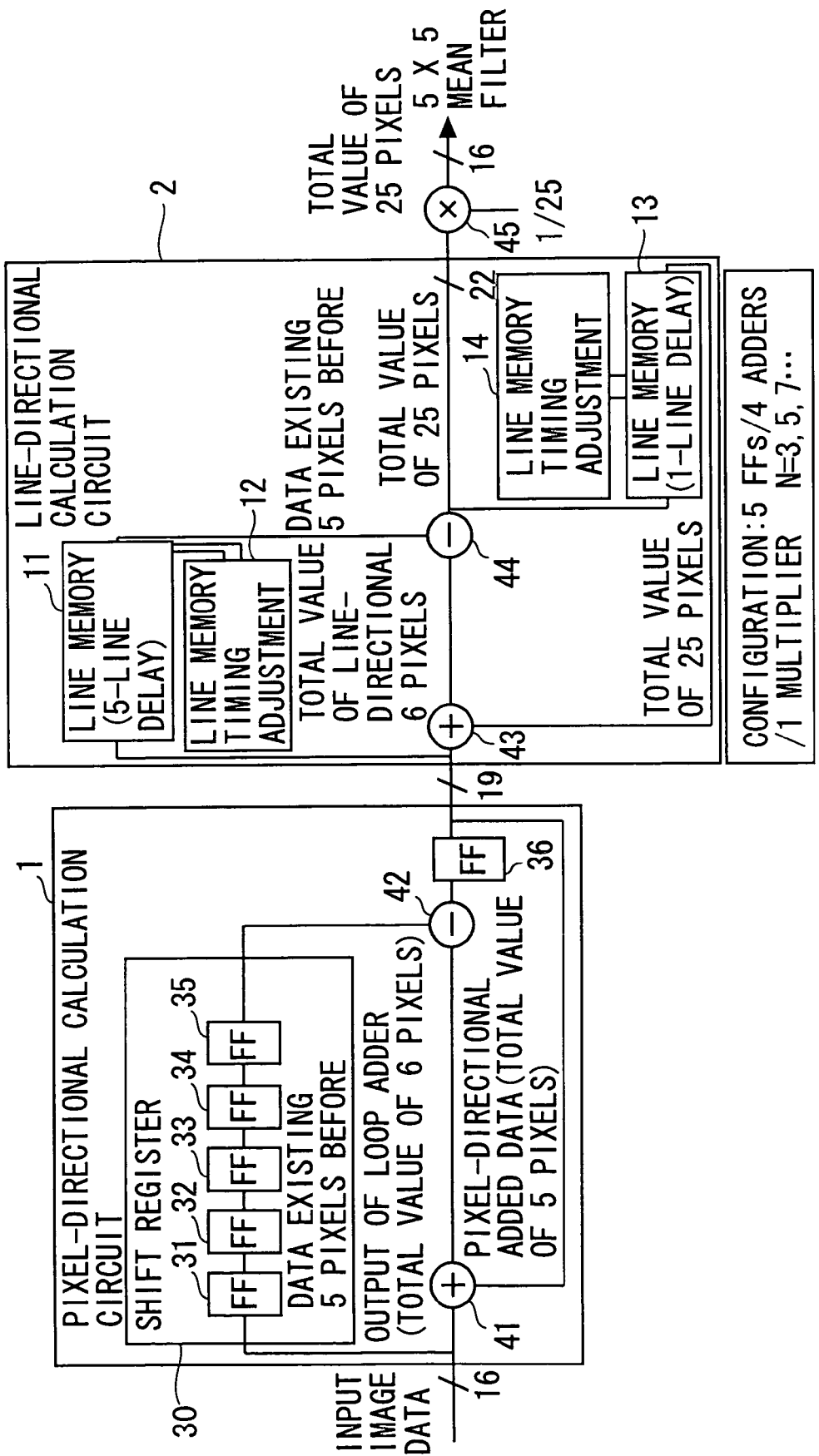
FIG. 7 shows a configurational example of a (5×5) mean filter according to a first embodiment of the present invention.
Figure 8:
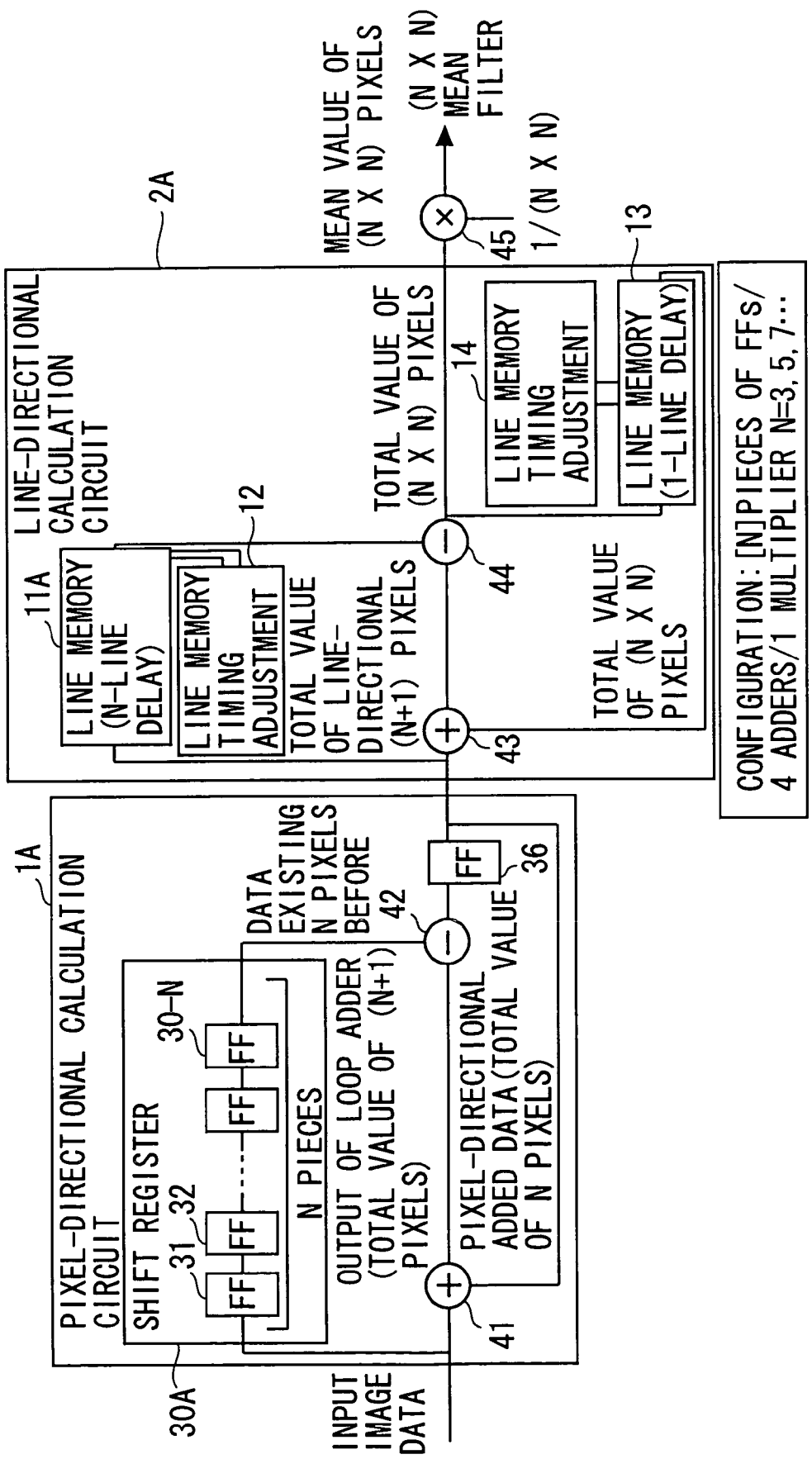
FIG. 8 shows a configurational example of an (N×N) mean filter according to the first embodiment of the present invention.

FIGS. 7 and 8 show an example of a configuration of the mean filter according to the first embodiment of the present invention. This mean filter is constructed of a pixel-directional calculation circuit 1 (corresponding to first integrating means), a line-directional calculation circuit 2 (corresponding to second integrating means) and a multiplier 45 (corresponding to dividing means) for executing $\frac{1}{25}$-fold multiplication. The mean filter circuit in FIG. 7 will hereinafter be explained.

The pixel-directional calculation circuit 1 includes a shift register 30 (corresponding to input retaining means) for shifting input image data pixel by pixel on a clock-by-clock basis and thus storing the input image data, an adder 41 (corresponding to first adding means) functioning as a loop adder by adding the input image data to pixel data stored on a FF 36, a subtracter 42 (corresponding to a first subtracter) for subtracting an output of a FF 35 from an added result of the loop adder, and the FF 36 (corresponding to addition retaining means) for outputting an output of the subtracter 42 with a 1-clock delay. Further, the shift register 30 is constructed by sequentially connecting the FFs (flip-flops) 31 through 35.

Herein, to start with, a loop adding process by the adder 41 and the FF 36 will be described. It is now supposed that the input image data given by 640 pixels×480 lines are inputted from outside. The "outside" herein implies the outside of the mean filter shown in FIG. 7, for example, an imaging device for capturing an image, and so on. Then, an assumption is that an on-processing line at the present is, for instance, a head line representing pieces of pixel data A–E shown in FIG. 1.

The pixel data A is accumulated on the FF 36 via the subtracter 42. Then, the pixel data A is added to the pixel data B by the adder 41 with the 1-clock delay. An added result (A+B) is accumulated on the FF 36. Thus, the adder 41 and the FF 36 function as integrators.

Further, the pixel data C, D and E are inputted to the adder 41 by repeating the same process, and thereafter an integrated result (A+B+C+D+E) is accumulated on the FF 36. This integrated result on the FF 36 is outputted as an output value of the pixel-directional calculation circuit 1 to the line-directional calculation circuit 2.

At this time, the pixel data E, D, C, B and A are accumulated on the FFs 31, 32, 33, 34 and 35 as sequentially shifted in the shift register 30. Accordingly, in the next clock, when the adder 41 adds the integrated result (A+B+C+D+E) of the FF 36 to a next piece of pixel data (which is the pixel data inputted next to the pixel data E and is referred to as, e.g., pixel data X), the pixel data A is subtracted by the subtracter 42. As a consequence, the FF 36 retains an integrated result of five pieces of pixel data (B+C+D+E+X).

This integrated result of the FF 36 is outputted as an output value of the pixel-directional calculation circuit 1 to the line-directional calculation circuit 2. In each of the subsequent clocks, the integration with a 5-pixel width is executed in the pixel direction by the FFs 31 through 35 and by the subtracting operation of the subtracter 42, and the integrated results given by C+D+E+X+Y, D+E+X+Y+Z, . . . are outputted as output values of the pixel-directional calculation circuit 1 to the line-directional calculation circuit 2 (wherein, Y and Z are the pixel data inputted after the pixel data X).

In this case, an addition of five pixels can be required of the data excluding the first two columns and the last two columns (which are the data excluding the first two pixels and the last two pixels in one line) among the input image data given by 640 pixels×480 lines, i.e., required of the data ranging from the 3rd column to the 638th column.

While on the other hand, there are none of the pixels (there is no pixel existing first two pixels before and last two pixels after in one line (which corresponds to an area excluding the image area defined by 640 pixels×480 lines)) that should be added with respect to the first two columns and the last two columns.

Therefore, the perfect 5-pixel addition can not be executed with respect to the first two columns and the last two columns. Namely, the perfect mean filter can not be applied to these pieces of pixel data. Such being the case, as for these areas, the original input data are quintupled as they are and thus used. An alternative method to be taken is that added values corresponding to the pixels in the 3rd column and the 478th column are respectively used as the added values of the first two columns and the last two columns.

Next, a configuration and an operation of the line-directional calculation circuit 2 will be explained. The line-directional calculation circuit 2 includes a line memory 11 (corresponding to first linear integrated data retaining means) for storing the image data for five lines by shifting line by line on the clock-by-clock basis, a line memory timing adjusting circuit 12 for controlling the shifting operation of the line memory 11, an adder 43 (corresponding to second adding means) functioning as a loop adder in the line direction by adding the image data inputted to the line-directional calculation circuit 2 to the pixel data stored on the line memory 13, a subtracter 44 (corresponding to a second subtracter) for subtracting the output of the line memory 11 from the added result of the loop adder, and a line memory 13 (corresponding to line addition retaining means) for outputting an output of the subtracter 44 with a 1-line delay.

Herein, a loop adding process in the line direction by the adder 43 and the line memory 13 is explained. Assumed herein is also the case of inputting the input image data given by 640 pixels×480 lines. As described above, the pixel data are replaced with a result of integrating the pixels by fives in the pixel direction by the pixel-directional calculation circuit 1. As described above, however, the added value corresponding to the first two columns and the last two columns is not a perfect added value.

Figure 1:
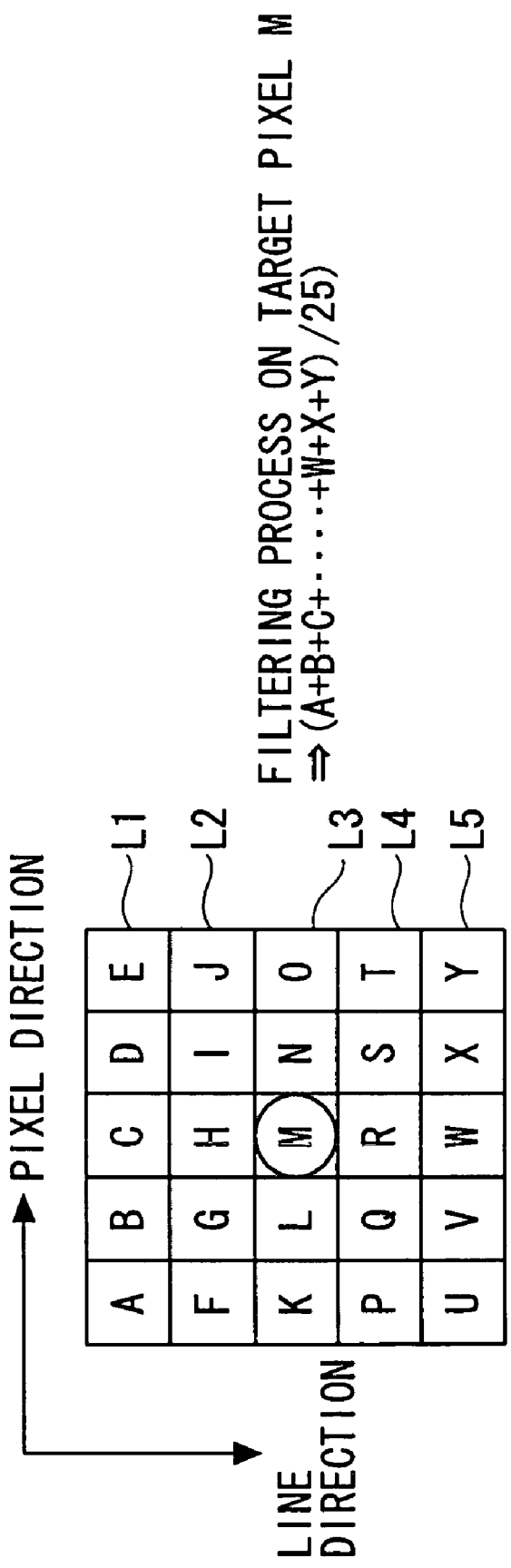
FIG. 1 is a diagram showing a concept of a mean filter.

Now, an assumption is that the on-processing line at the present is, for instance, the head line (which is now called a line L1) representing the pixel data A–E shown in FIG. 1.

Respective pieces of pixel data of the line L1 are sequentially accumulated on the line memory 13 via the adder 43 and the subtracter 44. The pixel data are likewise sequentially stored on the line memory 11.

When all the pixel data of the line L1 are stored on the line memory 13, the pixel data corresponding to a next line are sequentially inputted to the line-directional calculation circuit 2. The next line becomes a head line representing pixel data F–J, and this line is called a line L2.

Then, respective pieces of pixel data of this line L2 are inputted to the adder 43. On the other hand, the data of the line L1 with the 1-line delay are also outputted as an output of the line memory 13 to the adder 43.

As a result, the pixel data of the line L1 are added to the pixel data of the same columns (the data of the pixels existing in the same pixel direction) as the columns of the line L2. Added results are sequentially accumulated on the line memory 13. For instance, the data example in FIG. 1 is that the line memory 13 is sequentially stored with further added results of adding pieces of data corresponding to the pixels A and F, the pixels B and G, the pixels C and H, the pixels D and I and the pixels E and J (which are the pixel data already added by the pixel-directional calculation circuit 1). Thus, the adder 43 and the line memory 13 function as an integrator.

When integrating in this line direction, the data corresponding to the pixels of the line L1 are shifted by one line, and newly the data corresponding to the pixels of the line L2 are sequentially inputted to the line memory 11. Hence, when completing the additions of the line L1 and the line L2, the line memory 11 is accumulated with the data corresponding to the pixels of the lines L1 and L2.

Further, with repetitions of the same process, the data corresponding to the pixels of a line L3 (containing the pixels K, L, M, N, O in FIG. 1), a line L4 (containing the pixels P, Q, R, S, T in FIG. 1) and a line L5 (containing the pixels U, V, W, X, Y in FIG. 1) are inputted to the adder 43, and thereafter the line memory 13 is accumulated with a line-directional integrated result (which is one line (5-line integrated) data as a result of L1+L2+L3+L4+L5). This integrated result on the line memory 13 is outputted as an output value of the line-directional calculation circuit 2 to the multiplier 45. The pixel data as the result of L1+L2+L3+L4+L5 are outcomes of the integration by the pixel-directional calculation circuit 1 and by the line-directional calculation circuit 2, and eventually become values obtained by performing the 5-pixel integration both in the pixel direction and in the line direction. For instance, with respect to the pixel M in FIG. 1, it follows that the added value of A+B+ . . . +Y is calculated.

Further, at this time, the data corresponding to the respective pixels of the lines L5, L4, L3, L2 and L1 are sequentially shifted and thus accumulated on the line memory 11. Accordingly, at a next cycle (e.g., next 640 clocks), when the adder 43 goes on adding the integrated result (L1+L2+L3+L4+L5) on the line memory 13 to a next line (which is referred to as, e.g., a line L6 to be inputted next to the line L5), the subtracter 42 sequentially subtracts the data corresponding to the pixels of the line L1. Consequently, the integrated results of the 5-line pixel data (L2+L3+L4+L5+L6) are sequentially outputted pixel by pixel for 640 pixels. Then, it follows that the line memory 13 is accumulated with the integrated results of the 5-line pixel data (L2+L3+L4+L5+L6).

The data accumulated on this line memory 13 are sequentially outputted as output values of the line-directional calculation circuit 2 to the multiplier 45. In the subsequent clocks, the integration is executed with a 5-line width in the line direction by the line memory 11 and by the subtracting operation of the subtracter 44, and the integrated results given by L3+L4+L5+L6+L7, L4+L5+L6+L7+L8, . . . are outputted as output values of the line-directional calculation circuit 2 to the multiplier 4.

As in the case already explained about the pixel-directional calculation circuit 1, however, a perfect 25-pixel addition can not be effected for the respective pixels of the first two lines and for the last two lines in the line direction. A measure to be adopted for dealing with this may involve using quintupled data of the original input data or using the data of 3rd line and the 478th line in a way that replaces the data of the first two lines and the last two lines with the data of 3rd line and the 478th, and so forth.

Thus, the multiplier 45 receives sequential inputs of results of integrating the (5×5) pixel areas peripheral to each of the pixels as the pixel data given by 640 pixels×480 lines. The multiplier 45 multiples each data by ½5, and therefore a result of averaging (5×5) pixels is outputted from the multiplier 45.

FIG. 8 shows an (N×N) mean filter. The (5×5) mean filter was exemplified in FIG. 7. On the other hand, the mean filter shown in FIG. 8 is designed to generalize a range of the filtering process into an (N×N) area. In FIG. 8, N-pieces of flip-flops such as FF 31, FF 32, . . . FF 30-N are used for configuring a shift register 30A. Moreover, a line memory 11A includes memories for N lines. The operations are the same as in the case of FIG. 7, and hence those explanations are omitted.

Next, the line-directional calculation circuit 2 or 2A executes the loop-additions of the pixel-directional added values sequentially in the line direction. Then, the oldest data in the pixel-directional added values delayed in the line memory 11 or 11A are subtracted from the loop-added values in the line direction, thereby obtaining N-line added values in the line direction. Hence, a calculation delay from the input image data is caused corresponding to only the number of lines depending on a filter size, which occur due to the loop-additions. To be specific, based on this calculation, in the case of processing an image of which one frame is defined by, e.g., 640 pixels×480 lines, the calculation delay can be restrained within one frame.

As shown in FIG. 7 or 8, the pixel-directional calculation circuit 1 or 1A performs the loop-additions of the input image data sequentially in the pixel direction, and in the meantime the input image data delayed by the shift register 30 or 30A are subtracted from the loop-added values in the pixel direction, thereby obtaining added values of N pixels in the pixel direction.

Next, the line-directional calculation circuit 2 effects the loop-additions of the pixel-directional added values sequentially in the line direction, and meanwhile the oldest data in the pixel-directional added values delayed by the line memory 11 or 11A are subtracted from the loop-added values in the line direction. Added values of N lines in the line direction are thereby obtained. Such a configuration eliminates the necessity of combining the flip-flops and the adders that serve to adjust phases by delaying every pixel as by the prior art. Therefore, a hardware scale can be remarkably downsized. Moreover, even when building up the mean filter having a large filter size, it is sufficient to give only a small-scale addition of the FFs and the line memory, and the number of adders does not depend on the filter size.

Figure 9:
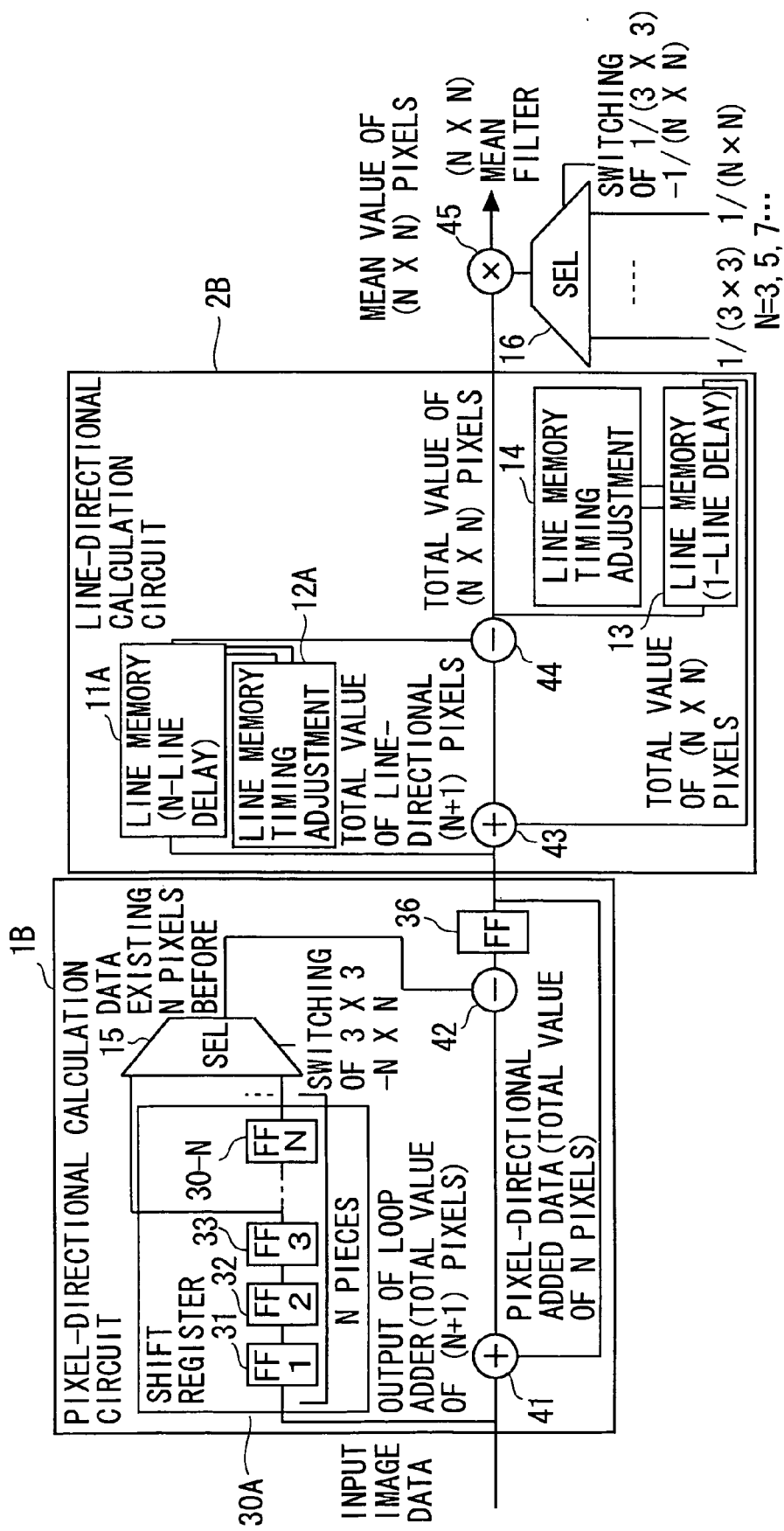
FIG. 9 shows a configurational example of a (3×3 through N×N) variable mean filter according to the first embodiment of the present invention.

FIG. 9 shows a variable mean filter (3×3 through N×N) according to the first embodiment of the present invention. This variable mean filter has, as compared with the mean filter in FIG. 8, an addition of selectors 15 and 16. Further, a line memory adjusting circuit 12A, according to a filter size given by 3×3 through N×N, reads the data from designated line positions and outputs the readout data to a subtraction circuit 44. The components other than the aforementioned components in FIG. 9 are the same as those in FIG. 8. The selector 15 receives an input of one of (3×3–N×N) switching signals and selects a position (an output of the flip-flop), corresponding to this input, on the shift register 30A. For example, the selector 15, when receiving the input of the (3×3) switching signal, selects an output of the FF 33. Thus, the FFs 31 through 30-N and the selector 15 are combined to configure a shift register having an arbitrary size within a (3–N) range.

Accordingly, a set of the adder 41 and the FF 36 and a set of the FFs 31 through 30-N, the selector 15 and the subtracter 42 are combined to build up an integrator for executing variable-size integration in the (3–N) range in the pixel direction.

Moreover, the line memory 11A has a capacity for the N lines (the maximum number of lines). Then, a line memory timing adjusting unit 12A receives the input of each of the (3×3–N×N) switching signals and reads the pixel data (an added result of a pixel-directional adder circuit 1B) from a position, corresponding to this input, on the line memory 11A.

Accordingly, a set of the adder 43 and the line memory 13 and a set of the line memory 11A, the line memory timing adjusting unit 12A and the subtracter 44 are combined to build up an integrator for executing the variable-size integration within the (3–N) range in the line direction. Integrated results thereof are inputted to the multiplier 45 as in the case shown in FIG. 7 or FIG. 8.

The selector 16 is connected to the multiplier 45. The selector 16 receives the input of one of the (3×3–N×N) switching signals and sets a multiplication value, corresponding to this input, of 1/(3×3) through 1/(N×N) in the multiplier 45. Hence, the multiplier 45 executes the multiplication in a way that switches over the multiplication value in the (1/(3×3)–1/(N×N)) range.

Thus, the shift register 30A (which is the range of FF 33 through FF 30-N) and the line memory 11A are stored with subtracted values (the oldest data among those forming the added values) subtracted from the loop-added values of the pixel-directional calculation circuit 1B and the line-directional calculation circuit 2B, respectively. Further, the selector 15 and the line memory adjusting unit 12A for adjusting a delay quantity of the subtracted value are provided. Then, the variable mean filter can be configured in the (3×3–N×N) filter size by selecting the outputs of the FF 33 through FF 30-N and the line memory 11A in accordance with the designated filter size.

EXAMPLE

Given hereinafter is an explanation of an example to which the mean filter having a fixed filter size is applied.

Figure 10:
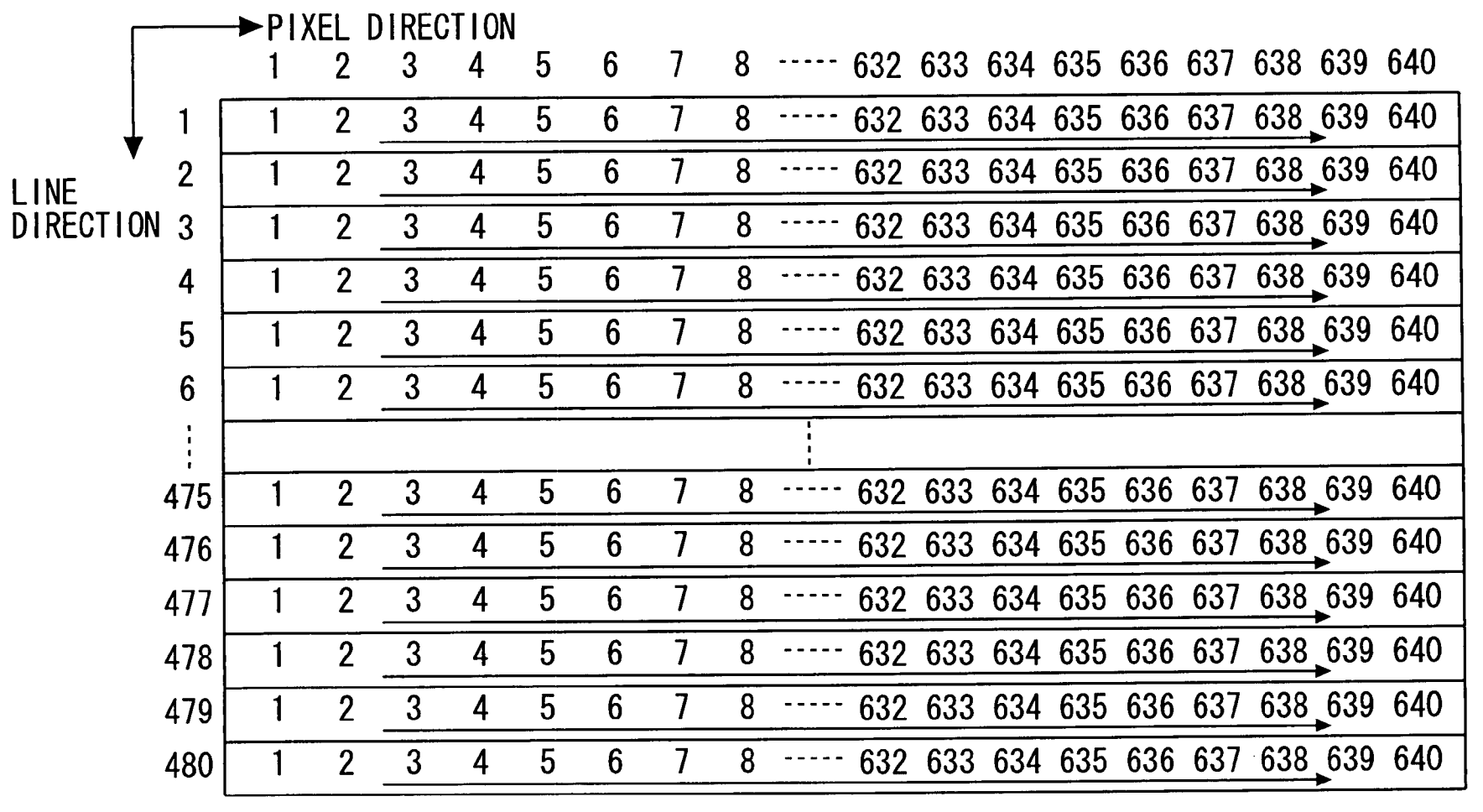

FIG. 10 is an explanatory diagram of the input image data in the example of the present invention. Processed herein are the (640×480) image data having 640 pixels in the pixel direction and 480 lines in the line direction. For facilitating the understanding, an assumption herein is that there is no invalid data period between the lines. Further, the image data is given in 16 bits/pixel.

As in FIG. 7, the pixel-directional calculation circuit 1 is constructed of the adder 41, the subtracter 42, the shift register 30 (5-pixel delay: for subtraction of extra data), and the FF 36 (1-pixel delay: for adjusting the phase of the added data). Now, the (640×480) pixels as in FIG. 10 are inputted as the image data to this pixel-directional calculation circuit 1.

Figure 11:
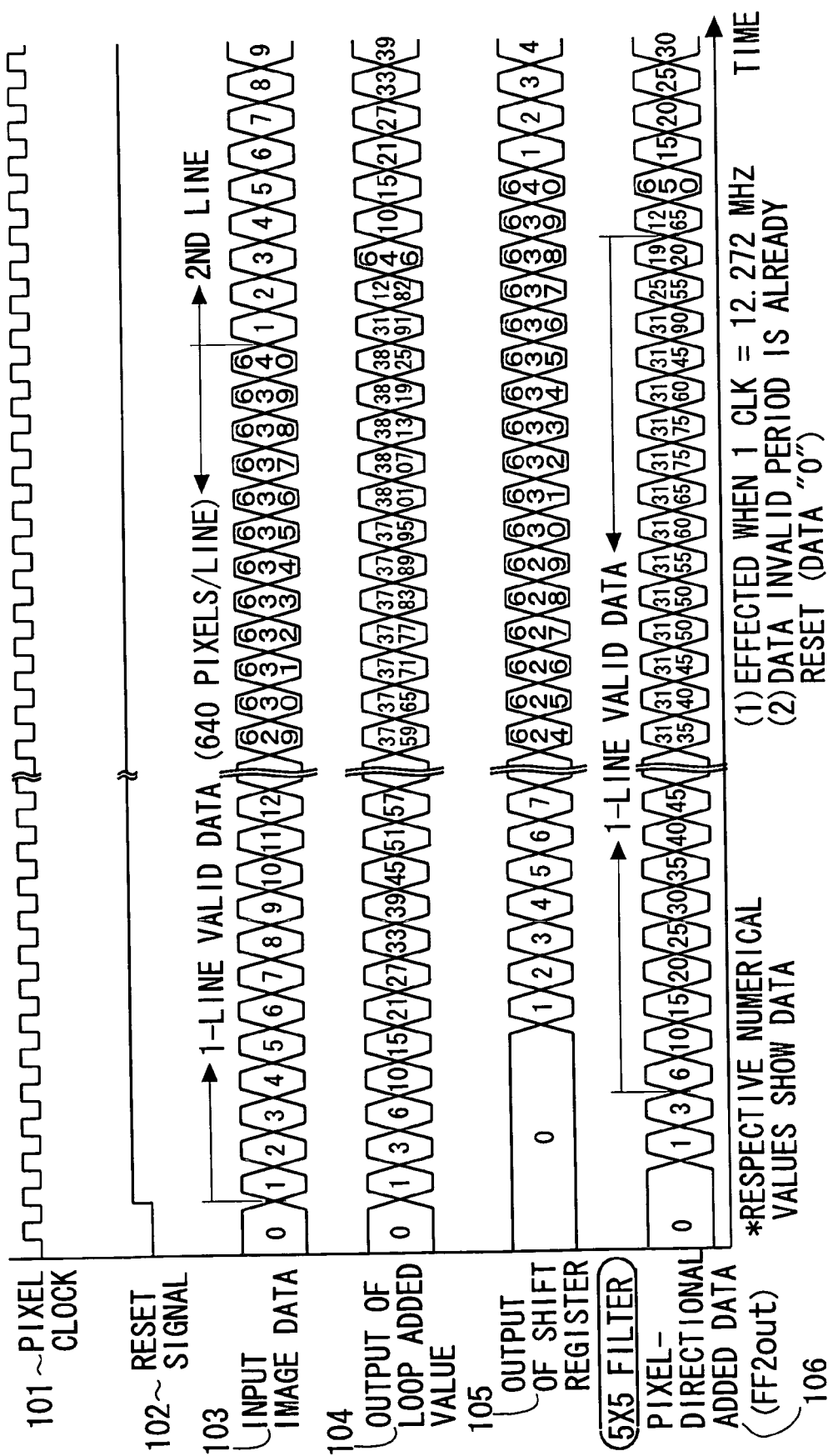
FIG. 11 is an explanatory diagram of a pixel-directional calculation in the embodiment of the present invention.

FIG. 11 shows results of the pixel-directional calculations. FIG. 11 illustrates signal waveforms of a pixel clock 101, a reset signal 102, input image data 103, a loop adder output 104, a shift register output 105 and pixel-directional added data 106.

Herein, the pixel clock 101 is a clock when displaying the image data on a pixel-by-pixel basis on an unillustrated display device. This pixel clock is used for the data processing for one pixel when inputting 1-pixel data, when delaying the 1-pixel data by the flip-flop, or when outputting results of the mean filter on the pixel-by-pixel basis, and so on in the mean filter circuit shown in FIGS. 7 through 9.

The reset signal 102 is a signal for initializing the mean filter circuit shown in FIGS. 7 through 9. After resetting by this reset signal, the (640×480) image data shown in FIG. 10 are processed.

The input image data 103 are data when the (640×480) pixels shown in FIG. 10 are sequentially inputted. Pieces of input image data are marked with numerals such as 1, 2, 3, etc. for illustrating corresponding relations with the respective pixels.

The loop adder output 104 is an output of the adder 41 shown in FIG. 7. Herein, an added result of, e.g., the pixel 1 and the pixel 2 is shown as an output value "3" in order to illustrate a corresponding relation between the added result and the original pixel. Moreover, an added result of the pixel 1, the pixel 2 and the pixel 3 is shown as an output value "6". Other outputs are expressed in the same way.

Further, the shift register output 105 is an output of the shift register 30 shown in FIG. 7. As shown in FIG. 11, the shift register output 105 is a value delayed by a 5-pixel clock from the input image data 103.

Furthermore, the pixel-directional added data 106 is an output of the FF 36 shown in FIG. 7. The data 106 is shown in a position where a value obtained by subtracting each value of the shift register output from each value of the loop adder output 104 is delayed by one clock in order to explicitly show a corresponding relation between the loop adder output 104 and the shift register output 105.

The loop adder output 104 shown in FIG. 11 is a result of loop-adding the input image data sequentially from the head of the data on the pixel-by-pixel basis. Namely, the output of the FF 36 that is set in phase with the next pixel is fed back to the adder 41 in order to add the second pixel, the third pixel, the fourth pixel and the fifth pixel to the next pixel.

When the mean filter takes the (5×5) size, after obtaining the added value of 6 pixels, it is required that the oldest data among those forming this added value of the 6 pixels be removed. Such being case, as in the case of the shift register output 105 in FIG. 11, the input image data which is previously delayed by 5 clocks with the shift register 30, are subtracted from the added value of the 6 pixels. The added value of the 5 pixels is thereby obtained and is, after adjusting the phase in FF 36 as in the case of the shift register output 106 in FIG. 11, outputted to the line-directional calculation circuit 2.

Thus, the output (the added value of the 5 pixels) of the FF 36 is fed back to the adder 41 and is added to newly inputted image data, thereby obtaining an added value of the 6 pixels. Further, this value is subtracted by the data existing 5 pixels before that was delayed by the shift register 30, and therefore the added value of the 5 pixels can be invariably obtained sequentially in the pixel direction.

As in FIG. 7, the line-directional calculation circuit 2 is constructed of the adder 43, the subtracter 44, the line memory 11 (5 line delay: for subtracting extra data), and the line memory 13 (1-line delay: for adjusting the phase of the added data). The line-directional calculation circuit 2 receives an input of the 5-pixel added value obtained above (640×480 pixels, 19 bits/pixel) in sequence as the image data.

Figure 12:
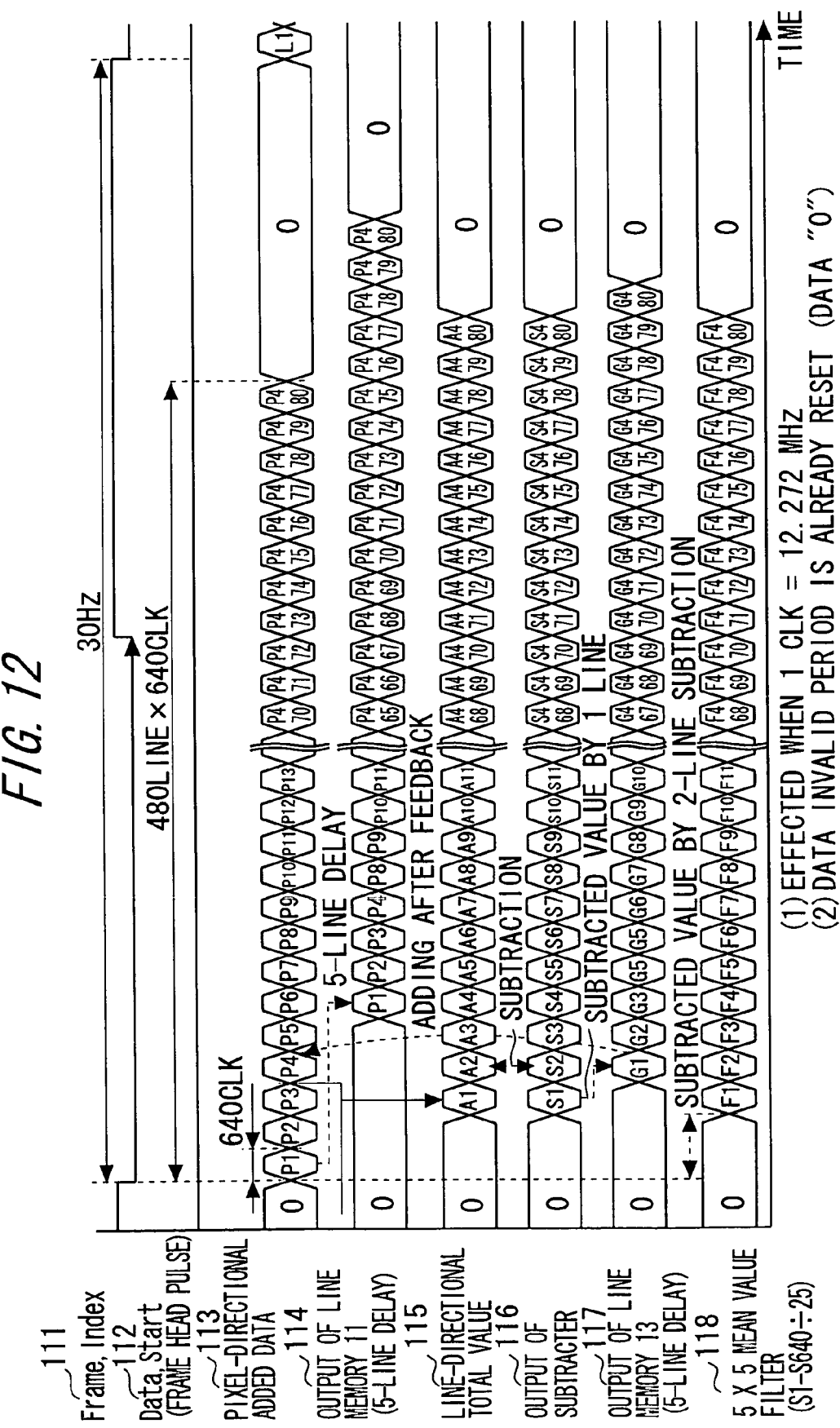
FIG. 12 is an explanatory diagram of a line-directional calculation in the embodiment of the present invention.

FIG. 12 shows results of the pixel-directional calculations. FIG. 12 shows signal waveforms of a frame index 111, a frame head pulse 112, pixel-directional data 113, a line memory 11 output 114, a line-directional total value 115, a subtracter output 116, a line memory 13 output 117 and a (5×5) mean filter 118.

The frame index 111 is a signal that is switched from an L-output to an H-output once within one frame in order to take frame synchronization. Further, the frame head pulse 112 is a pulse indicating a head of the frame.

The pixel-directional added data 113 is the same signal as that of the pixel-directional added data 106 shown in FIG. 11. In FIG. 12, however, the signal elements of, e.g., P1, P2 correspond to the 1-line data corresponding to 640 clocks.

The line memory 11 output 114 is an output signal of the line memory 11 shown in FIG. 7 and is one input signal to the subtracter 44.

The line-directional total value 115 is an output signal of the adder 43 shown in FIG. 7 and is the other input signal to the subtracter 44.

The subtracter output 116 is a signal obtained by subtracting the line memory 11 output 114 from the line-directional total value 115.

The line memory 13 output 117 is an output signal of the line memory 13 shown in FIG. 7 and is a signal inputted with a 1-line delay to the adder 43.

The (5×5) mean filter 118 is image data subjected to the filtering process, which is outputted from the multiplier 45 shown in FIG. 7.

As in the case of the line-directional total value 115 in FIG. 12, the pixel-directional added data are loop-added in the line direction on the pixel-by-pixel basis sequentially from the head of the data. Namely, the phase with the next line is adjusted by the line memory 13 in order to add the pixels in the second line, the third line, the fourth line and the fifth line in sequence to the next pixel-directional added data. Then, the data are fed with a 1-line delay back to the adder. If the mean filter to be acquired takes the (5×5) size, after obtaining the added values for 6 lines in the line direction, it is required that the oldest data among those forming the 6-line added values be removed.

Then, as in the case of the memory 11 output 114 in FIG. 12, there are prepared beforehand the pixel-directional added data obtained in such a way that the line memory 11 delays the input image data by 5 lines. Then, the line memory 11 output 114 is subtracted from the line-directional total value 115, whereby an added value of 25 pixels can be acquired and then outputted to the multiplier 45.

Thus, the output (the added value of 25 pixels) of the line memory 13 is fed back to the adder 43 and added to a newly inputted line (the pixel-directional added data), thereby obtaining a 6-line added value. Then, this 6-line added value is subtracted by the data existing 5 lines before that was delayed by the line memory 11, and therefore the added value of the 25 pixels can be invariably obtained in realtime in sequence.

Further, at this time, as in FIG. 12, the (5×5) mean filter can be configured with a 2-line calculation delay. For example, in the case of the data example in FIG. 1, at a point of time when the addition of the line L5 containing the pixel data Y is completed, the filtering process for the line L3 containing pieces of pixel data K, L, M, O, P is completed. When generalizing this mean filter into an (N×N) mean filter, the mean filter can be actualized with a calculation delay of an N/2 integer part line.

<Effects of Embodiment>

The filter circuit according to the first embodiment exhibits the following effects 1–3.

Figure 2:
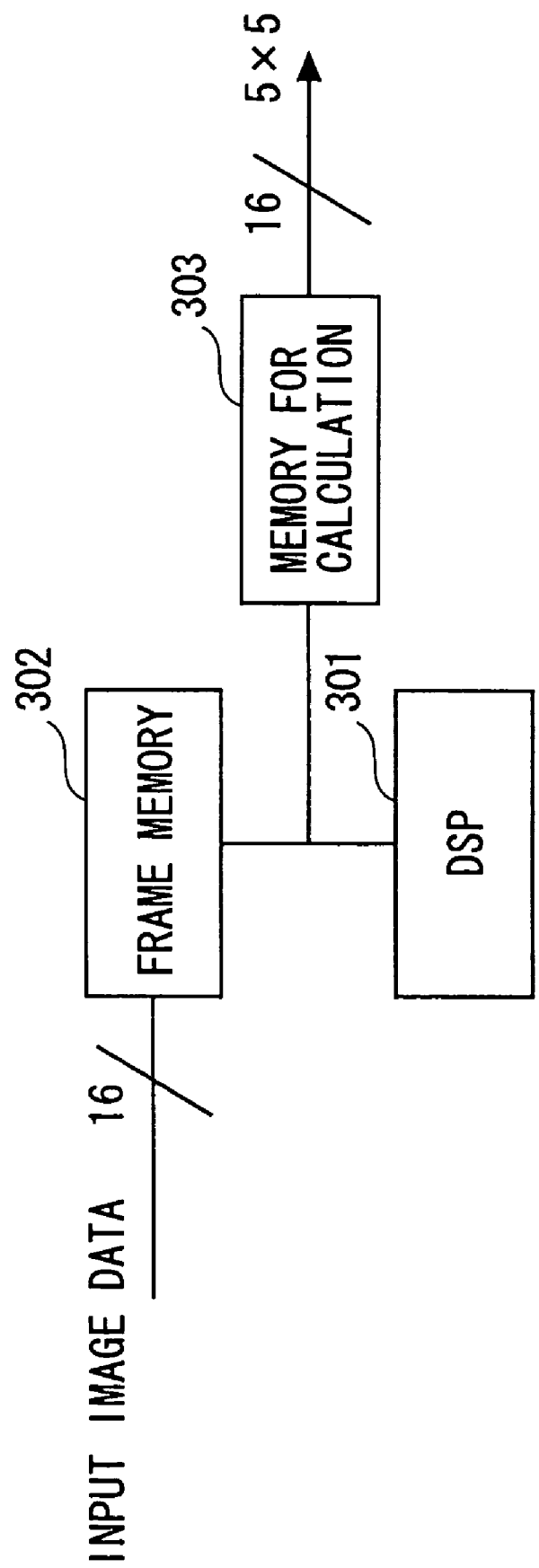
FIG. 2 is a diagram of a configuration of a software-based filter on a DSP.
Figure 3:
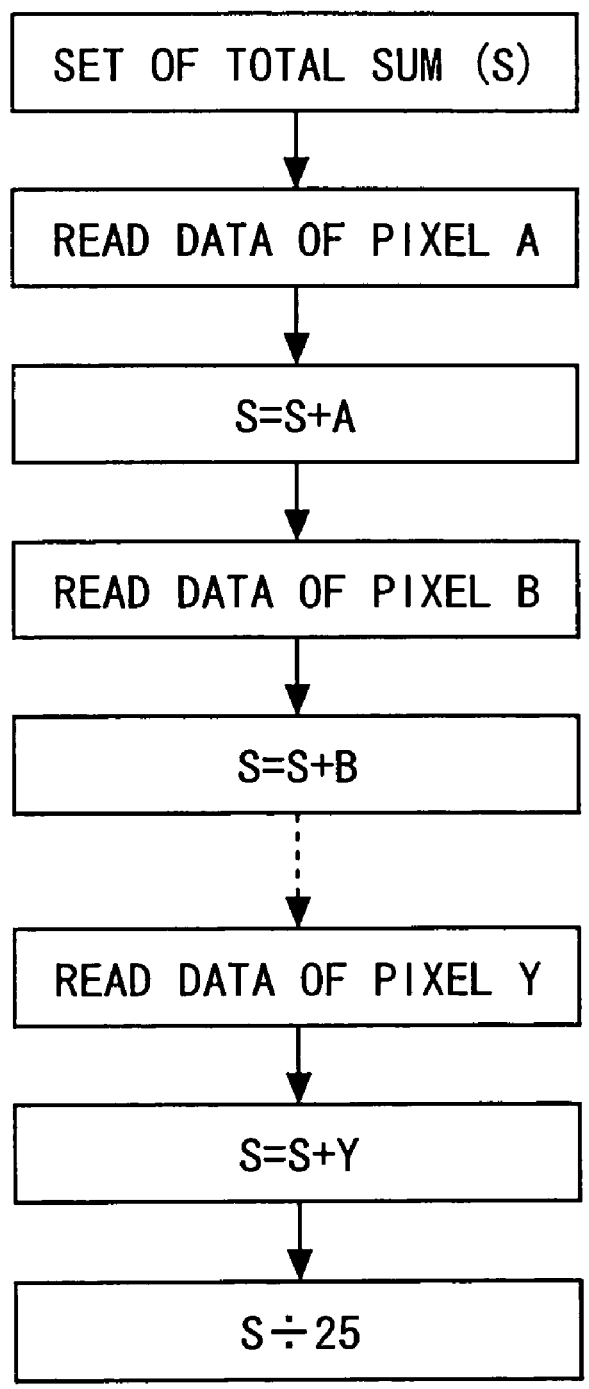
FIG. 3 is a diagram showing a processing procedure of the DSP for providing a mean filter function.
Figure 4:
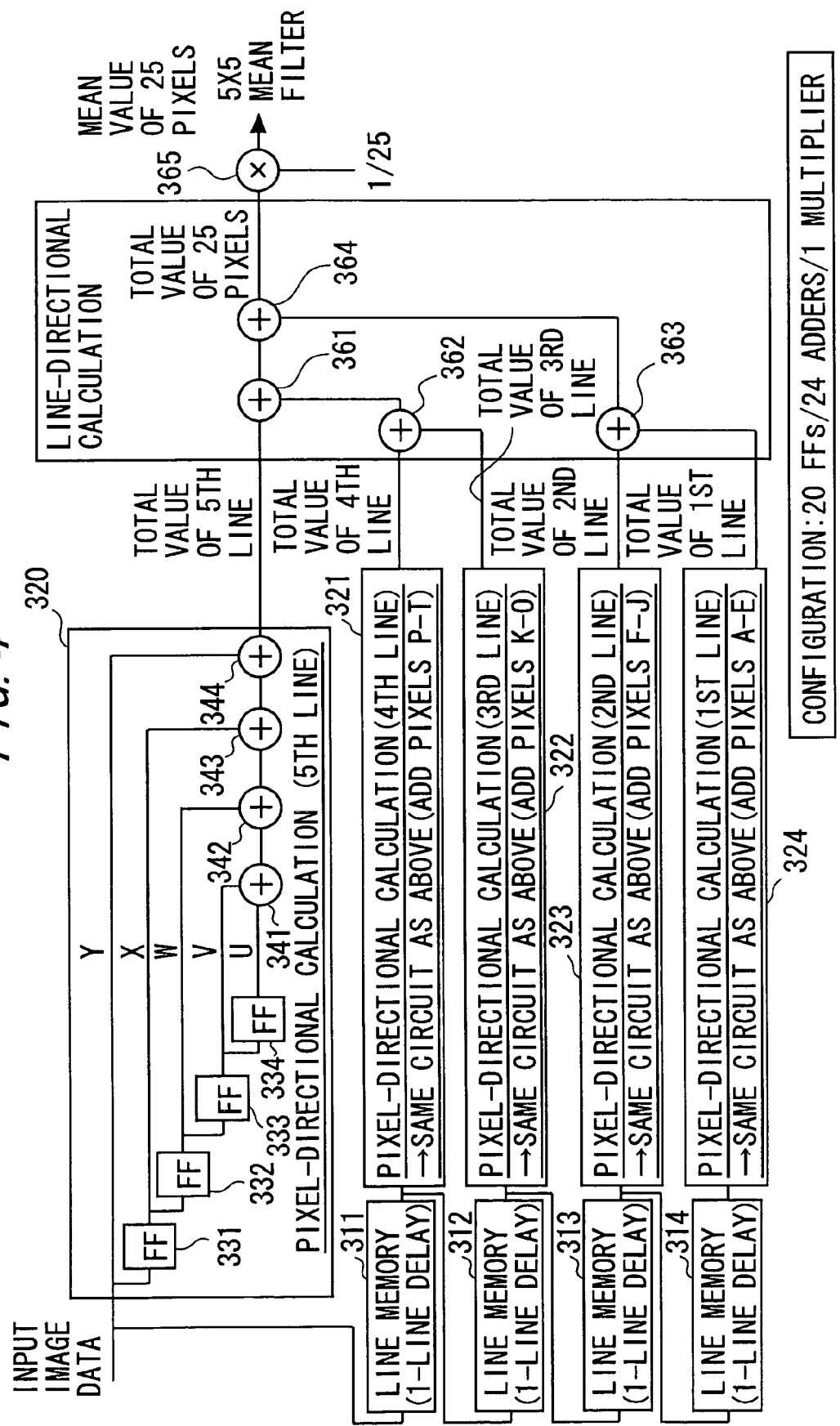
FIG. 4 shows a configurational example of a conventional hardware-based (5×5) mean filter.

(1) Comparing with filters being configured softwarewise (FIGS. 2 and 3), the mean filter can be configured to implement the realtime processing (the processing with no frame delay) in the present filter circuit. For instance, the mean filter can be applied with a delay of the N/2 integer part line (N=3, 5, 7, . . . ) to the input image data.

Figure 5:
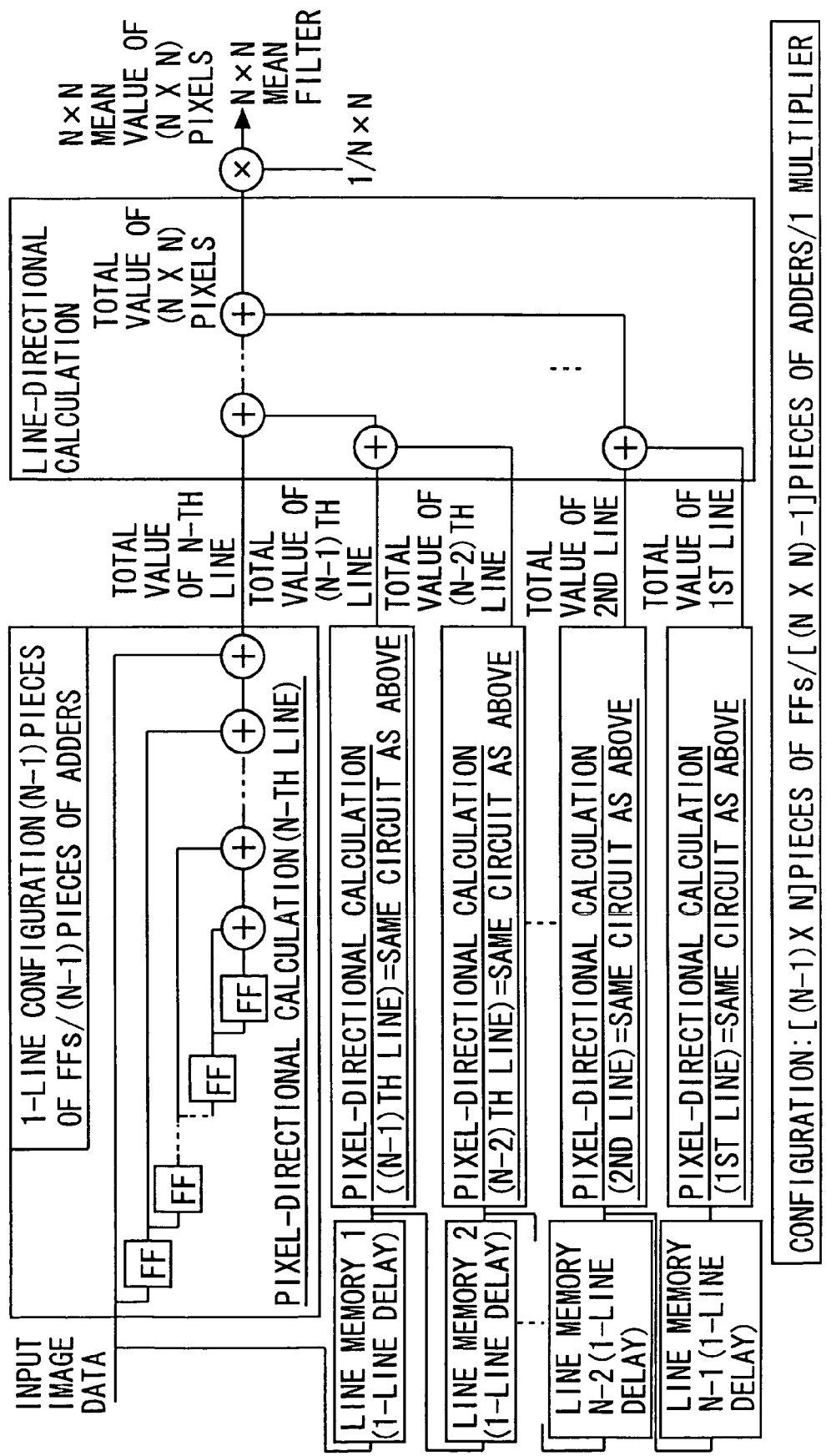
FIG. 5 shows a configurational example of a conventional hardware-based (N×N) mean filter.

(2) For example, in comparison between the prior art in FIG. 5 and the present proposal in FIG. 8, a large reduction on the hardware scale can be estimated as follows.

The prior art (the hardware processing) takes the configuration including [N−1] systems of line memories, [(N−1)× N] pieces of FFs and [(N×N)−1] pieces of adders (N=3, 5, 7, . . . ).

On the other hand, the first embodiment takes the configuration of [N] pieces of FFs, [4] pieces of adders and N-systems of line memories (N=3, 5, 7, . . . ).

Figure 6:
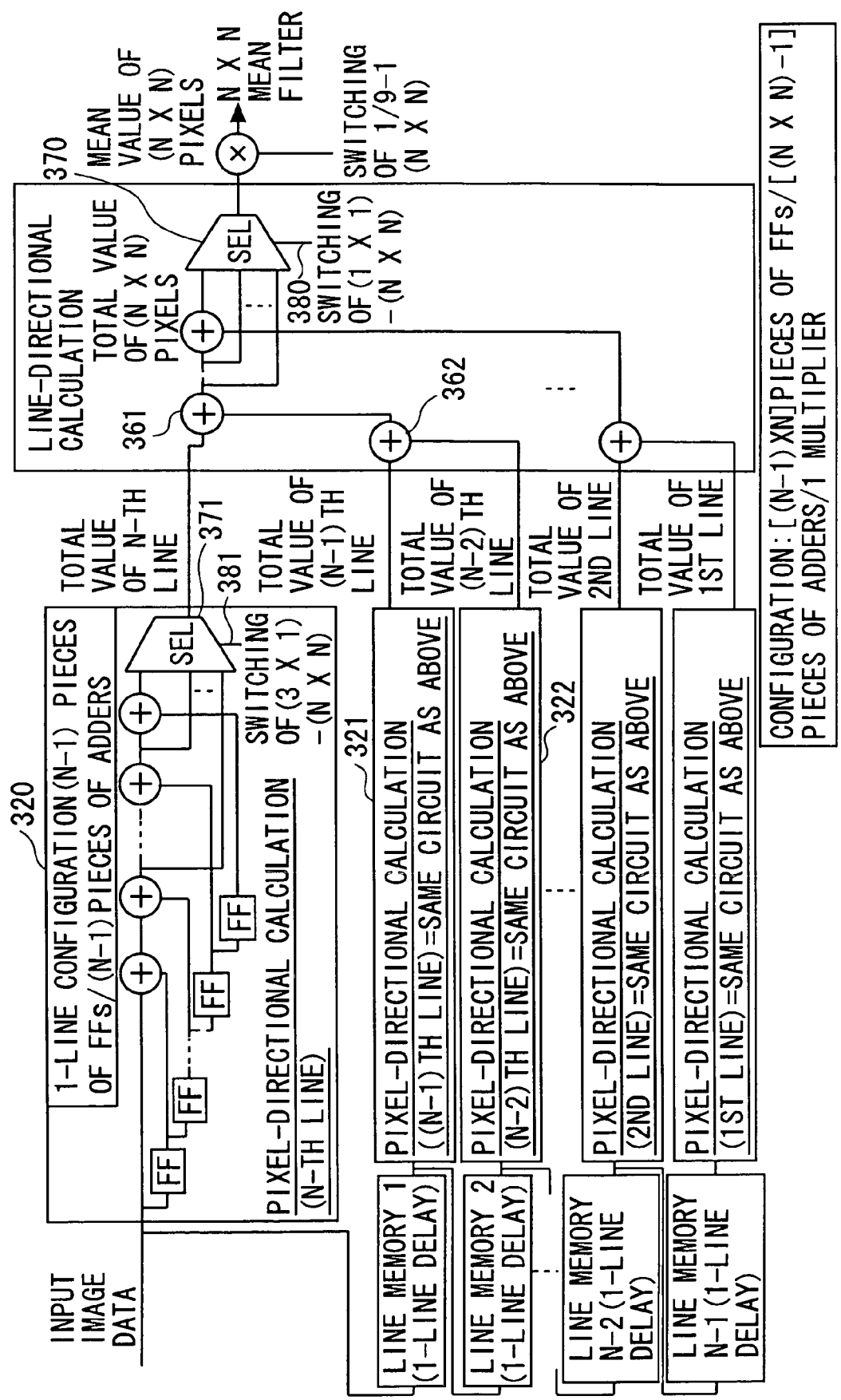
FIG. 6 shows a configurational example of a conventional hardware-based (3×3 through N×N) variable mean filter.

(3) In comparison between the prior art in FIG. 6 and the present proposal in FIG. 7, a large reduction of the redundant circuits can be estimated when changing the filter size.

In comparing the redundancy scales with each other when N=3 by way of an example, the prior art (the hardware processing) has a redundancy degree such as ([(N−1)×N]−3) pieces of FFs, [((N×N)−1−3)] pieces of adders and (N−3) systems of line memories (N=3, 5, 7, . . . ).

On the other hand, the present proposal has a redundancy degree such as [N−3] pieces of FFs, [4] pieces of adders and (N−3) systems of line memories (N=3, 5, 7, . . . ).

<<Second Embodiment>>

Figure 13:
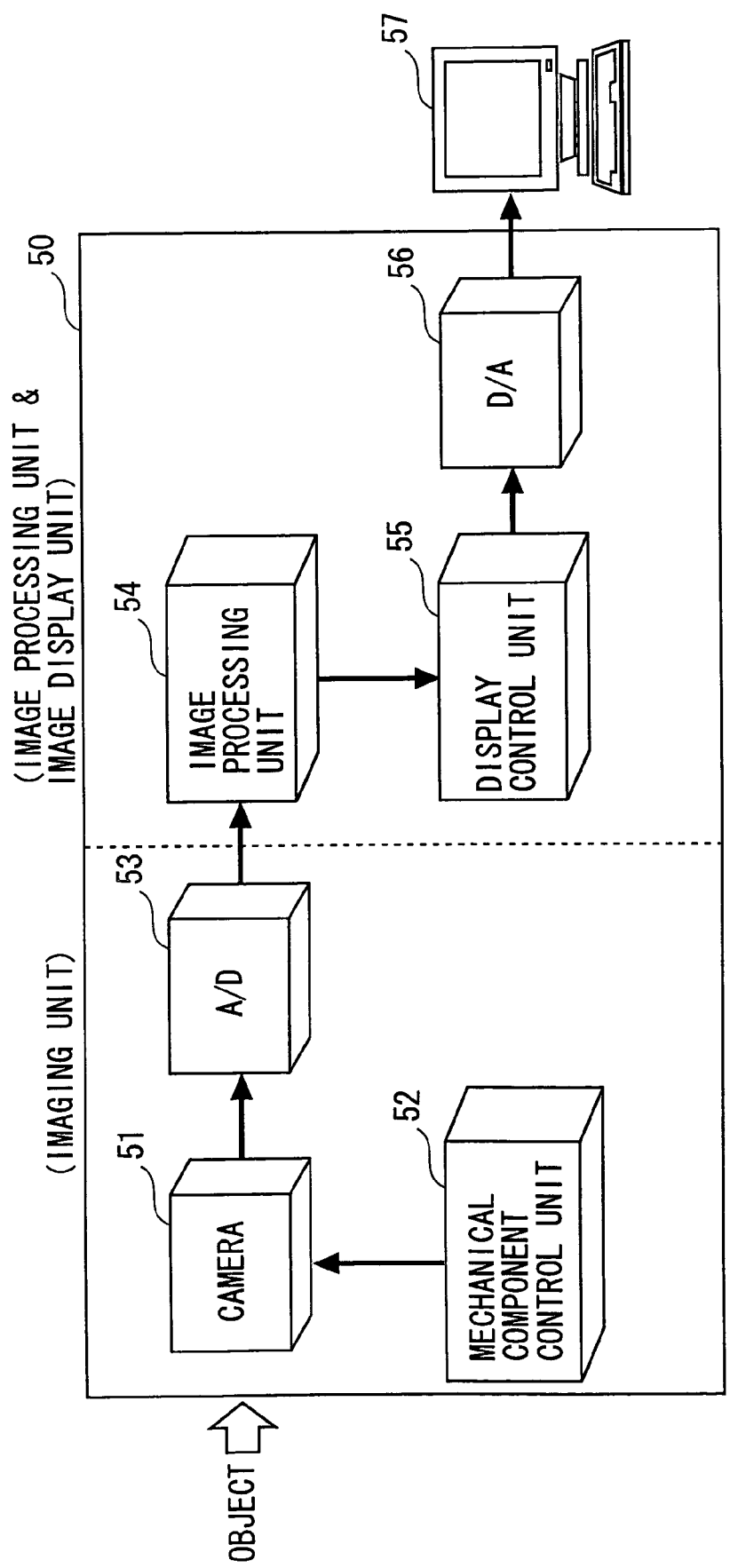
FIG. 13 is a diagram of a system of an imaging device in a second embodiment of the present invention.

FIG. 13 is a system diagram of an imaging device 50 in a second embodiment of the present invention. This imaging device includes a camera unit 51, a mechanical component control unit 52 for controlling the camera unit 51, an A/D converter 53 for converting video signal given from the camera unit 51 into digital data, an image processing unit 54 for executing the image processing such as filtering, etc. with respect to an output from the A/D converter 53, a display control unit 55 for controlling the display device 57 on the basis of an output of the image processing unit 54 and a D/A converter 56 for converting the output signals of the display control unit 55 into analog data and supplying the analog data to the display device 57.

The camera unit 51 transfers, based on the control of the mechanical component control unit 52, the video signals acquired by capturing an image of an object to the A/D converter 53. The A/D converter 53 generates the pixel data form the video signals on a frame-by-frame basis, and inputs the pixel data at the pixel clocks shown in FIG. 11 to the image processing unit 54.

The image processing unit 54 has the mean filter circuit shown in, e.g., FIGS. 7 through 9 and executes, as in the processing upon the input image data shown in FIG. 11, the image processing upon the image data given from the A/D converter 53. In this case, as already discussed in the first embodiment, the mean filter processing can be executed with no frame delay.

The image data to which the mean filter is thus applied are outputted in realtime to the display device 57.

<Industrial Applicability>

The present invention can be applied to a manufacturing industry of semiconductor devices for providing a signal processing function, to manufacturing industries of information devices, imaging devices, image recording devices, broadcasting devices, etc. to which the signal processing is applied, and to a service industry utilizing those devices.

What is claimed is:

1. A mean filter device comprising:
   first integrating means integrating a predetermined number of pieces of pixel data disposed in periphery of each pixel in a first linear direction in a pixel data matrix forming a two-dimensional image, and thus generating first integrated pixel data of each of the pixels;
   second integrating means integrating the first integrated pixel data corresponding to a predetermined number of pixels disposed in the periphery of each of the pixels in a second linear direction, and thus generating second integrated pixel data of each of the pixels; and
   means dividing the second integrated pixel data by the number of pixels integrated in the first linear direction and in the second linear direction; and
   wherein said first integrating means includes first adding means adding the input pixel data inputted and the pixel data already integrated before inputting the input pixel data, and addition retaining means retaining the already-integrated pixel data, a first subtracting means includes input retaining means retaining the predetermined number of pieces of input pixel data in sequence, and a first subtracter subtracting, from an output of said first adding means, the input pixel data disposed apart by the predetermined number of pieces of pixel data from the now-inputted pixel data and outputting the subtracted result as a predetermined pixel integrated value to said addition retaining means, and said addition retaining means feedback-outputs the predetermined pixel integrated value to said first adding means for a next addition.

2. A mean filter device according to claim 1, wherein said first integrating means includes first sequential integrating means integrating the pixel data sequentially in the first linear direction, and first subtracting means subtracting, from the sequentially integrated results, the pixel data of the pixel disposed apart by a predetermined number of pixels in the first linear direction from the integration target pixels to be integrated sequentially.

3. A mean filter device according to claim 1, wherein said input retaining means includes a shift register storing the data corresponding each pixel by shifting, and a selector selectively outputting any one piece of pixel data among the pieces of pixel data stored in the respective shift positions on said shift register.

4. A mean filter device according to claim 1, wherein said second integrating means includes second sequential integrating means integrating the pixel data sequentially in the second linear direction, and second subtracting means subtracting, from a result of the sequential integration, the pixel data of the pixel disposed apart by the predetermined number of pieces of pixels in the second linear direction from the integration target pixels to be integrated in sequence.

5. A mean filter device according to claim 4, wherein said second sequential integrating means includes second adding means adding the first integrated pixel data inputted from said first integrating means to the pixel data already integrated in the second linear direction before inputting the first integrated pixel data, and line addition retaining means retaining the second-linear-directionally integrated pixel data for one line in the first linear direction,
   said second subtracting means includes first linear integrated data retaining means sequentially retaining the first integrated pixel data for a predetermined number of lines that are inputted from said first integrating means, and a second subtracter subtracting, from an output of said second adding means, the first integrated pixel data of the line disposed apart by a predetermined number of lines from the now-inputted first integrated pixel data, and outputting the subtracted result as a predetermined line integrated value to said line addition retaining means, and
   said line addition retaining means feedback-outputs the predetermined line integrated value to said second adding means for a next addition.

6. A mean filter device according to claim 5, wherein said first linear integrated data retaining means includes a line memory retaining line data corresponding the pixels, arranged in the first linear direction, of the two-dimensional image in a way that shifts the line data over a plurality of lines, and a line selection unit selectively outputting any one of the plural lines.

7. A filtering method comprising:
   a first integrating step integrating a predetermined number of pieces of pixel data disposed in periphery of each pixel in a first linear direction in a pixel data matrix forming a two-dimensional image, and thus generating first integrated pixel data of each of the pixels;
   a second integrating step integrating the first integrated-pixel data corresponding to a predetermined number of pixels disposed in the periphery of each of the pixels in a second linear direction, and thus generating second integrated pixel data of each of the pixels; and a step dividing the second integrated pixel data by the number of pixels integrated in the first linear direction and in the second linear direction; and wherein said first integrating step includes a first adding step adding the input pixel data inputted and the pixel data already integrated before inputting the input pixel data, and an addition retaining step retaining the already-integrated pixel data, a first subtracting step includes an input retaining step retaining the predetermined number of pieces of input pixel data in sequence, a step subtracting, from an output of said first adding step, the input pixel data disposed apart by the predetermined number of pieces of pixel data from the now-inputted pixel data, and outputting the subtracted result as a predetermined pixel integrated value to processing of said addition retaining step, and said addition retaining step includes a step feedback-outputing the predetermined pixel integrated value for processing of said first adding step for a next addition.

8. A filtering method according to claim 7, wherein said first integrating step includes a first sequential integrating step integrating the pixel data sequentially in the first linear direction, and a first subtracting step subtracting, from the sequentially integrated results, the pixel data of the pixel disposed apart by a predetermined number of pixels in the first linear direction from the integration target pixels to be integrated sequentially.

9. A filtering method according to claim 7, wherein said input retaining step includes a step storing the data corresponding each pixel by shifting, and a step selectively outputting any one piece of pixel data among the pieces of pixel data stored in the respective shift positions.

10. A filtering method according to claim 7, wherein said second integrating step includes a second sequential integrating step integrating the pixel data sequentially in the second linear direction, and a second subtracting step subtracting, from a result of the sequential integration, the pixel data of the pixel disposed apart by the predetermined number of pieces of pixels in the second linear direction from the integration target pixels to be integrated in sequence.

11. A mean filtering method according to claim 10, wherein said second sequential integrating step includes a second adding step adding the first integrated pixel data generated by said first integrating step to the pixel data already integrated in the second linear direction before inputting the first integrated pixel data, and a line addition retaining step retaining the second-linear-directionally integrated pixel data for one line in the first linear direction, said second subtracting step includes a first linear integrated data retaining step sequentially retaining the first integrated pixel data for a predetermined number of lines that are inputted from said first integrating step, a step subtracting, from an output of said second adding step, the first integrated pixel data of the line disposed apart by a predetermined number of lines from the now-inputted first integrated pixel data, and a step outputting the subtracted result as a predetermined line integrated value for the processing of said line addition retaining step, and said line addition retaining step includes a step feedback-outputting the predetermined line integrated value for processing of said second adding step for a next addition.

12. A filtering method according to claim 11, wherein said first linear integrated data retaining step includes a step retaining line data corresponding the pixels, arranged in the first linear direction, of the two-dimensional image in a way that shifts the line data over a plurality of lines, and a step selectively outputting any one of the plural lines.

13. An imaging device having a mean filter device, comprising, an imaging unit, a filter unit and a display unit, said filter unit including:

first integrating means integrating a predetermined number of pieces of pixel data disposed in periphery of each pixel in a first linear direction in a pixel data matrix forming a two-dimensional image, and thus generating first integrated pixel data of each of the pixels;

second integrating means integrating the first integrated pixel data corresponding to a predetermined number of pixels disposed in the periphery of each of the pixels in a second linear direction, and thus generating second integrated pixel data of each of the pixels; and means dividing the second integrated pixel data by the number of pixels integrated in the first linear direction and in the second linear direction; and wherein said first integrating means includes first adding step adding the input pixel data inputted and the pixel data already integrated before inputting the input pixel data, and an addition retaining step retaining the already-integrated pixel data, a first subtracting step includes an input retaining step retaining the predetermined number of pieces of input pixel data in sequence, a step subtracting, from an output of the first adding step, the input pixel data disposed apart by the predetermined number of pieces of pixel data from the now-inputted pixel data, and a step outputting the subtracted result as a predetermined pixel integrated value for processing of said addition retaining step, and said addition retaining step includes a step feedback-outputting the predetermined pixel integrated value for processing of said first adding step for a next addition.

14. A mean filter device comprising: a first integrating unit integrating a predetermined number of pieces of pixel data disposed in periphery of each pixel in a first linear direction in a pixel data matrix forming a two-dimensional image, and thus generating first integrated pixel data of each of the pixels; a second integrating unit integrating the first integrated pixel data corresponding to a predetermined number of pixels disposed in the periphery of each of the pixels in a second linear direction, and thus generating second integrated pixel data of each of the pixels; and a unit dividing the second integrated pixel data by the number of pixels integrated in the first linear direction and in the second linear direction; and wherein said first integrating unit includes a first adding unit adding the input pixel data inputted and the pixel data already integrated before inputting the input pixel data, and an addition retaining unit retaining the already-integrated pixel data, a first subtracting unit includes an input retaining unit retaining the predetermined number of pieces of input pixel data in sequence, and a first subtracter subtracting, from an output of said first adding unit, the input pixel data disposed apart by the predetermined number of pieces of pixel data from the now-inputted pixel data and outputting the subtracted result as a predetermined pixel integrated value to said addition retaining unit, and said addition retaining unit feedback-outputs the predetermined pixel integrated value to said first adding unit for a next addition.

15. A mean filter device according to claim 14, wherein said first integrating unit includes a first sequential integrating unit integrating the pixel data sequentially in the first linear direction, and a first subtracting unit subtracting, from the sequentially integrated results, the pixel data of the pixel disposed apart by a predetermined number of pixels in the first linear direction from the integration target pixels to be integrated sequentially.

16. A mean filter device according to claim 14, wherein said second integrating unit includes a second sequential integrating unit integrating the pixel data sequentially in the second linear direction, and a second subtracting unit subtracting, from a result of the sequential integration, the pixel data of the pixel disposed apart by the predetermined number of pieces of pixels in the second linear direction from the integration target pixels to be integrated in sequence.

17. A mean filter device according to claim 16, wherein said second sequential integrating unit includes a second adding unit adding the first integrated pixel data inputted from said first integrating unit to the pixel data already integrated in the second linear direction before inputting the first integrated pixel data, and a line addition retaining unit retaining the second-linear-directionally integrated pixel data for one line in the first linear direction, said second subtracting unit includes a first linear integrated data retaining unit sequentially retaining the first integrated pixel data for a predetermined number of lines that are inputted from said first integrating unit, and a second subtracter subtracting, from an output of said second adding unit, the first integrated pixel data of the line disposed apart by a predetermined number of lines from the now-inputted first integrated pixel data, and outputting the subtracted result as a predetermined line integrated value to said line addition retaining unit, and said line addition retaining unit feedback-outputs the predetermined line integrated value to said second adding unit for a next addition.

* * * * *

UNITED STATES PATENT AND TRADEMARK OFFICE
CERTIFICATE OF CORRECTION

PATENT NO. : 7,149,364 B2
APPLICATION NO. : 11/074992
DATED : December 12, 2006
INVENTOR(S) : Kohei Umeda et al.

It is certified that error appears in the above-identified patent and that said Letters Patent is hereby corrected as shown below:

Col. 15, lines 40 - Col. 16, line 3, Claim 1 should be amended to read as follows:

1. A mean filter device comprising:
first integrating means integrating a predetermined number of pieces of pixel data disposed in periphery of each pixel in a first linear direction in a pixel data matrix forming a two-dimensional image, and thus generating first integrated pixel data of each of the pixels;
second integrating means integrating the first integrated pixel data corresponding to a predetermined number of pixels disposed in the periphery of each of the pixels in a second linear direction, and thus generating second integrated pixel data of each of the pixels; and
means dividing the second integrated pixel data by the number of pixels integrated in the first linear direction and in the second linear direction; and
wherein said first integrating means includes first adding means adding the input pixel data inputted and the pixel data already integrated before inputting the input pixel data, addition retaining means retaining the already-integrated pixel data, and a first subtracting means including input retaining means retaining the predetermined number of pieces of input pixel data in sequence, and a first subtracter subtracting, from an output of said first adding means, the input pixel data disposed apart by the predetermined number of pieces of pixel data from the now-inputted pixel data and outputting the subtracted result as a predetermined pixel integrated value to said addition retaining means, and said addition retaining means feedback-outputs the predetermined pixel integrated value to said first adding means for a next addition.

Col. 16, lines 4-11, Claim 2 should be amended to read as follows:

2. A mean filter device according to claim 1, wherein the first subtracting means subtracting, from the sequentially integrated results, the pixel data of the pixel disposed apart by a predetermined number of pixels in the first linear direction from the integration target pixels to be integrated sequentially.

Col. 16, lines 56 - Col. 17, line 19, Claim 7 should be amended to read as follows:

7. A filtering method comprising:
a first integrating step integrating a predetermined number of pieces of pixel data disposed in periphery of each pixel in a first linear direction in a pixel data matrix forming a two-dimensional image, and thus generating first integrated pixel data of each of the pixels;
a second integrating step integrating the first integrated-pixel data corresponding to a predetermined number of pixels disposed in the periphery of each of the pixels in a second linear direction, and thus generating second integrated pixel data of each of the pixels; and
a step dividing the second integrated pixel data by the number of pixels integrated in the first linear direction and in the second linear direction; and wherein said first integrating step includes a first adding step adding the input pixel data inputted and the pixel data already integrated before inputting the input pixel data, and an addition retaining step retaining the already-integrated pixel data, and a first subtracting step including an input retaining step retaining the predetermined number of pieces of input pixel data in sequence, a step subtracting, from an output of said first adding step, the input pixel data disposed apart by the predetermined number of pieces of pixel data from the now-inputted pixel data, and outputting the subtracted result as a predetermined pixel integrated value to processing of said addition retaining step, and said addition retaining step includes a step feedback-outputing the predetermined pixel integrated value for processing of said first adding step for a next addition.

Col. 17, lines 20-27, Claim 8 should be amended to read as follows:

8. A filtering method according to claim 7, wherein the first subtracting step subtracting, from the sequentially integrated results, the pixel data of the pixel disposed apart by a predetermined number of pixels in the first linear direction from the integration target pixels to be integrated sequentially.

Col. 18, lines 37-64, Claim 14 should be amended to read as follows:

14. A mean filter device comprising:
a first integrating unit integrating a predetermined number of pieces of pixel data disposed in periphery of each pixel in a first linear direction in a pixel data matrix forming a two-dimensional image, and thus generating first integrated pixel data of each of the pixels;
a second integrating unit integrating the first integrated pixel data corresponding to a predetermined number of pixels disposed in the periphery of each of the pixels in a second linear direction, and thus generating second integrated pixel data of each of the pixels; and
a unit dividing the second integrated pixel data by the number of pixels integrated in the first linear direction and in the second linear direction; and
wherein said first integrating unit includes a first adding unit adding the input pixel data inputted and the pixel data already integrated before inputting the input pixel data, an addition retaining unit retaining the already-integrated pixel data, and a first subtracting unit including an input retaining unit retaining the predetermined number of pieces of input pixel data in sequence, and a first subtracter subtracting, from an output of said first adding unit, the input pixel data disposed apart by the predetermined number of pieces of pixel data from the now-inputted pixel data and outputting the subtracted result as a predetermined pixel integrated value to said addition retaining unit, and said addition retaining unit feedback-outputs the predetermined pixel integrated value to said first adding unit for a next addition.

CERTIFICATE OF CORRECTION (continued)
U.S. Pat. No. 7,149,364 B2

Col. 18, lines 65 - Col. 19, line 5, Claim 15 should be amended to read as follows:

15. A mean filter device according to claim 14, wherein the first subtracting unit subtracting, from the sequentially integrated results, the pixel data of the pixel disposed apart by a predetermined number of pixels in the first linear direction from the integration target pixels to be integrated sequentially.

Signed and Sealed this

Ninth Day of February, 2010

David J. Kappos
*Director of the United States Patent and Trademark Office*